(12) United States Patent
Yang et al.

(10) Patent No.: US 11,841,539 B2
(45) Date of Patent: Dec. 12, 2023

(54) OPTICAL MODULE

(71) Applicant: HISENSE BROADBAND MULTIMEDIA TECHNOLOGIES CO., LTD., Qingdao (CN)

(72) Inventors: Sigeng Yang, Qingdao (CN); Xuxia Liu, Qingdao (CN); Peng He, Qingdao (CN)

(73) Assignee: HISENSE BROADBAND MULTIMEDIA TECHNOLOGIES CO., LTD, Qingdao (CN)

( * ) Notice: Subject to any disclaimer, the term of this patent is extended or adjusted under 35 U.S.C. 154(b) by 0 days.

(21) Appl. No.: 17/704,554

(22) Filed: Mar. 25, 2022

(65) Prior Publication Data

US 2022/0283389 A1 Sep. 8, 2022

Related U.S. Application Data

(63) Continuation of application No. PCT/CN2020/126301, filed on Nov. 3, 2020.

(30) Foreign Application Priority Data

Nov. 25, 2019 (CN) .......................... 201911167001.4
Nov. 25, 2019 (CN) .......................... 201911167023.0

(51) Int. Cl.
*H04B 10/00* (2013.01)
*G02B 6/42* (2006.01)
(52) U.S. Cl.
CPC ........... *G02B 6/4206* (2013.01); *G02B 6/428* (2013.01); *G02B 6/4242* (2013.01); *G02B 6/4284* (2013.01)
(58) Field of Classification Search
CPC .... G02B 6/4206; G02B 6/4242; G02B 6/428; G02B 6/4284; G02B 6/4246
See application file for complete search history.

(56) References Cited

U.S. PATENT DOCUMENTS 6,198,864 B1 * 3/2001 Lemoff ................ G02B 6/2938
  385/47
6,385,374 B2 * 5/2002 Kropp .................. G02B 6/4246
  385/47

(Continued)

FOREIGN PATENT DOCUMENTS

CN    103430069 A    12/2013
CN    104597575 A    5/2015

(Continued)

OTHER PUBLICATIONS

First Office Action and search report issued by the National Intellectual Property Administration Of People's Republic Of China for application No. CN 201911167001.4 dated Dec. 22, 2022.

(Continued)

*Primary Examiner* — Agustin Bello
(74) *Attorney, Agent, or Firm* — REISING ETHINGTON, P.C.

(57) ABSTRACT

An optical module includes a circuit board, an optical emission chip array, an optical receiver chip array, an optical fiber array, and a lens assembly. The lens assembly includes a body with a step provided at a bottom portion thereof, an emission lenses array, an optical fiber lenses array, and a receiving lenses array. The emission lenses array and the receiving lenses array are respectively arranged on two step surfaces of the step, such that focal points thereof respectively fall on an emission surface of the optical emission chip array and a light sensitive surface of the optical receiver chip array. A first groove for forming a first reflective surface and a second groove for arranging a light filter that refracts light towards the optical fiber lenses array or reflects light to the receiving lenses array are provided at a top portion of the body.

17 Claims, 7 Drawing Sheets

(56) References Cited

U.S. PATENT DOCUMENTS

| | | | | |
|---|---|---|---|---|
| 6,396,978 B1* | 5/2002 | Grann | | G02B 6/29358 |
| | | | | 385/74 |
| 6,636,540 B2* | 10/2003 | Uebbing | | G02B 6/4286 |
| | | | | 372/50.1 |
| 6,888,988 B2* | 5/2005 | Vancoille | | G02B 6/4227 |
| | | | | 385/47 |
| 6,939,058 B2* | 9/2005 | Gurevich | | G02B 6/4206 |
| | | | | 385/88 |
| 6,959,133 B2* | 10/2005 | Vancoill | | G02B 6/4214 |
| | | | | 385/47 |
| 7,539,367 B2* | 5/2009 | Tamura | | G02B 6/4214 |
| | | | | 385/14 |
| 8,335,411 B2* | 12/2012 | Kuznia | | G02B 6/4214 |
| | | | | 385/47 |
| 8,641,296 B2* | 2/2014 | Nishimura | | G02B 6/4214 |
| | | | | 385/33 |
| 8,787,714 B2* | 7/2014 | Morioka | | G02B 6/4246 |
| | | | | 385/35 |
| 8,909,058 B2* | 12/2014 | Sheu | | H04B 10/40 |
| | | | | 398/139 |
| 8,923,670 B2* | 12/2014 | Zbinden | | G02B 6/4214 |
| | | | | 385/33 |
| 8,939,657 B2* | 1/2015 | Hung | | G02B 6/42 |
| | | | | 385/89 |
| 9,116,312 B2* | 8/2015 | Lin | | G02B 6/4246 |
| 9,223,098 B2 | 12/2015 | Morioka et al. | | |
| 9,244,234 B2* | 1/2016 | Tanazawa | | G02B 27/143 |
| 9,323,013 B2* | 4/2016 | Shao | | G02B 6/4246 |
| 9,377,594 B2* | 6/2016 | Liff | | G02B 6/43 |
| 9,429,725 B2* | 8/2016 | Shao | | H04B 10/40 |
| 9,513,448 B2* | 12/2016 | Sun | | G02B 6/4215 |
| 9,692,516 B2* | 6/2017 | Zhou | | H04B 10/40 |
| 9,801,578 B2* | 10/2017 | Weber | | A61B 5/1459 |
| 9,869,818 B2* | 1/2018 | Tang | | G02B 6/32 |
| 9,880,366 B2* | 1/2018 | Vallance | | G02B 6/4251 |
| 9,891,385 B2* | 2/2018 | Tang | | G02B 6/4286 |
| 10,025,043 B2* | 7/2018 | Vallance | | G02B 6/124 |
| 10,156,687 B2* | 12/2018 | Morioka | | G02B 27/10 |
| 10,168,500 B2* | 1/2019 | Amit | | H04B 10/58 |
| 10,209,458 B2* | 2/2019 | Kurashima | | G02B 6/327 |
| 10,345,497 B2* | 7/2019 | Wu | | G02B 6/4206 |
| 10,365,444 B2* | 7/2019 | Morioka | | H01S 5/02253 |
| 10,416,397 B2* | 9/2019 | Morioka | | G02B 6/4214 |
| 10,481,353 B2* | 11/2019 | Morioka | | G02B 6/425 |
| 10,591,686 B2* | 3/2020 | Kon | | G02B 6/4298 |
| 10,976,510 B2* | 4/2021 | Kon | | H01S 5/02251 |
| 11,067,761 B2* | 7/2021 | Kon | | H01S 5/02325 |
| 11,137,558 B2* | 10/2021 | Morioka | | G02B 6/4215 |
| 11,184,088 B2* | 11/2021 | Li | | H04B 10/66 |
| 11,409,060 B2* | 8/2022 | Kon | | G02B 6/425 |
| 11,418,262 B2* | 8/2022 | Han | | H04B 10/40 |
| 11,493,707 B2* | 11/2022 | Kon | | G02B 6/4214 |
| 2003/0152336 A1* | 8/2003 | Gurevich | | G02B 6/4246 |
| | | | | 385/88 |
| 2004/0105161 A1* | 6/2004 | Tatum | | G02B 27/145 |
| | | | | 359/634 |
| 2008/0055589 A1* | 3/2008 | Asami | | G01M 11/3127 |
| | | | | 356/73.1 |
| 2008/0226228 A1* | 9/2008 | Tamura | | G02B 6/4214 |
| | | | | 385/33 |
| 2009/0252503 A1* | 10/2009 | Ishigami | | H04B 10/40 |
| | | | | 398/200 |
| 2011/0097037 A1* | 4/2011 | Kuznia | | G02B 6/4204 |
| | | | | 264/1.24 |
| 2012/0193522 A1* | 8/2012 | Yan | | G02B 6/4204 |
| | | | | 250/227.28 |
| 2012/0263416 A1* | 10/2012 | Morioka | | G02B 6/4286 |
| | | | | 385/33 |
| 2013/0064507 A1* | 3/2013 | Mahnkopf | | G02B 6/12007 |
| | | | | 385/52 |
| 2013/0209038 A1 | 8/2013 | Pommer | | |
| 2013/0242401 A1* | 9/2013 | Shibuya | | G02B 6/4204 |
| | | | | 359/627 |
| 2013/0287406 A1* | 10/2013 | Huang | | G02B 6/4214 |
| | | | | 398/139 |
| 2014/0029953 A1* | 1/2014 | Otte | | G02B 6/4214 |
| | | | | 398/139 |
| 2014/0133802 A1* | 5/2014 | Morioka | | G02B 6/4286 |
| | | | | 385/33 |
| 2014/0169746 A1 | 6/2014 | Hung | | |
| 2014/0226988 A1* | 8/2014 | Shao | | H04B 10/40 |
| | | | | 398/139 |
| 2014/0312214 A1 | 10/2014 | Hung | | |
| 2014/0314422 A1* | 10/2014 | Shao | | H04B 10/40 |
| | | | | 398/138 |
| 2014/0328558 A1* | 11/2014 | Morioka | | G02B 6/4286 |
| | | | | 385/33 |
| 2015/0010272 A1* | 1/2015 | Tanazawa | | G02B 6/4286 |
| | | | | 385/31 |
| 2015/0030285 A1* | 1/2015 | Tanazawa | | G02B 6/4214 |
| | | | | 385/31 |
| 2015/0286016 A1* | 10/2015 | Arao | | G02B 6/43 |
| | | | | 385/79 |
| 2016/0004020 A1* | 1/2016 | Shao | | G02B 6/4286 |
| | | | | 385/24 |
| 2017/0048015 A1* | 2/2017 | O'Daniel | | H04B 10/506 |
| 2018/0284368 A1* | 10/2018 | Morioka | | G02B 6/4214 |
| 2019/0101712 A1* | 4/2019 | Kon | | G02B 6/4212 |
| 2020/0409000 A1* | 12/2020 | Kon | | G02B 6/4286 |
| 2022/0283389 A1* | 9/2022 | Yang | | G02B 6/4242 |

FOREIGN PATENT DOCUMENTS

| | | |
|---|---|---|
| CN | 104597576 A | 5/2015 |
| CN | 107024746 A | 8/2017 |
| CN | 107589488 A | 1/2018 |
| JP | 2011211152 A | 10/2011 |

OTHER PUBLICATIONS

English translation of the first affice action and search report issued by the National Intellectual Property Administration Of People's Republic Of China for application No. CN 201911167001.4 dated Dec. 22, 2022.

First Office Action and search report issued by the National Intellectual Property Administration Of People's Republic Of China for application No. CN 201911167023.0 dated Dec. 22, 2022.

English translation of the first office action and search report issued by the National Intellectual Property Administration Of People's Republic Of China for application No. CN 201911167023.0 dated Dec. 22, 2022.

International Search Report and Written Opinion issued for PCT/CN2020/0126301 dated Jan. 29, 2021; 9 pages.

* cited by examiner

OPTICAL MODULE

This application claims the priority to the Application No. 201911167001.4, filed with the China National Intellectual Property Administration on Nov. 25, 2019, and the priority to the Application No. 201911167023.0, filed with the China National Intellectual Property Administration on Nov. 25, 2019, which are incorporated herein by references in their entirety.

FIELD

The present disclosure relates to the field of optical communication technologies, and in particular, to an optical module.

BACKGROUND

Bidirectional optical modules are widely used in communication networks for conversion of optical signals and electrical signals and making the signals suitable for long-distance transmission. An optical assembly of the bidirectional optical module transmits a modulated optical signal from the optical module to an external optical fiber connected with the optical module; and meanwhile, the optical assembly of the bidirectional optical module may also enable the optical module to receive an optical signal from the external optical fiber connected with the optical module.

SUMMARY

An optical module provided in the present disclosure includes: a circuit board, comprising a signal circuit and configured to transmit an optical signal; an optical emission chip array, attached on a surface of the circuit board and configured to emit an optical signal; an optical receiver chip array, attached on the surface of the circuit board and configured to receive converged light; an optical fiber array; a lens assembly, disposed on the surface of the circuit board and configured to establish an optical coupling with the optical fiber array; the lens assembly comprising: a body, wherein a step is provided at a bottom portion of the body; an emission lenses array, converting light emitted by the optical emission chip array into a collimated beam to be incident to a first reflective surface; an optical fiber lenses array, disposed on a side wall of the body, and configured to establish an optical coupling with the optical fiber array; and an receiving lenses array, enabling a collimated beam from the optical fiber lenses array to be converged onto the optical receiver chip array, wherein the step comprises two step surfaces with different heights at the bottom portion of the body, wherein one of the step surfaces is configured to arrange the emission lenses array, and the other step surface is configured to arrange the receiving lenses array; a focal point of the emission lenses array falls on an emission surface of the optical emission chip array; and a focal point of the receiving lenses array falls on a light sensitive surface of the optical receiver chip array; and a first groove and a second groove are provided at a top portion of the body, wherein a first reflective surface is formed at a bottom portion of the first groove, and reflects light from the emission lenses array to the optical fiber lenses array; the second groove is configured to arrange a light filter, and the light filter refracts light from the first reflective surface towards the optical fiber lenses array, or reflects light from the optical fiber lenses array to the receiving lenses array.

Another optical module provided in the present disclosure includes: a circuit board, comprising a signal circuit and configured to transmit an optical signal; an optical emission chip array, attached on a surface of the circuit board and configured to emit an optical signal; an optical receiver chip array, attached on the surface of the circuit board and configured to receive converged light, wherein the optical receiver chip array and the optical emission chip array have different heights; an optical fiber array; a lens assembly, disposed on the surface of the circuit board and configured to establish an optical coupling with the optical fiber array; the lens assembly comprising: a body; an emission lenses array, converting light emitted by the optical emission chip array into a collimated beam to be incident to a first reflective surface; an optical fiber lenses array, disposed on a side wall of the body, and configured to establish an optical coupling with the optical fiber array; and an receiving lenses array, enabling a collimated beam from the optical fiber lenses array to be converged onto the optical receiver chip array, wherein a specification of the receiving lens is different from that of the emission lens; wherein the emission lenses array and the receiving lenses array are disposed at a bottom portion of the body; a first groove and a second groove are provided at a top portion of the body, wherein a first reflective surface is formed at a bottom portion of the first groove, and reflects light from the emission lenses array to the optical fiber lenses array; the second groove is configured to arrange a light filter, and the light filter refracts light from the first reflective surface towards the optical fiber lenses array, or reflects light from the optical fiber lenses array to the receiving lenses array.

DRAWINGS

To more clearly describe the technical solutions of the present disclosure, the accompanying drawings to be used in the embodiments will be described briefly below. Other accompanying drawings may also be derived, without an inventive effort, by one of ordinary skills in the art from these accompanying drawings.

DETAILED DESCRIPTION

Figure 1:
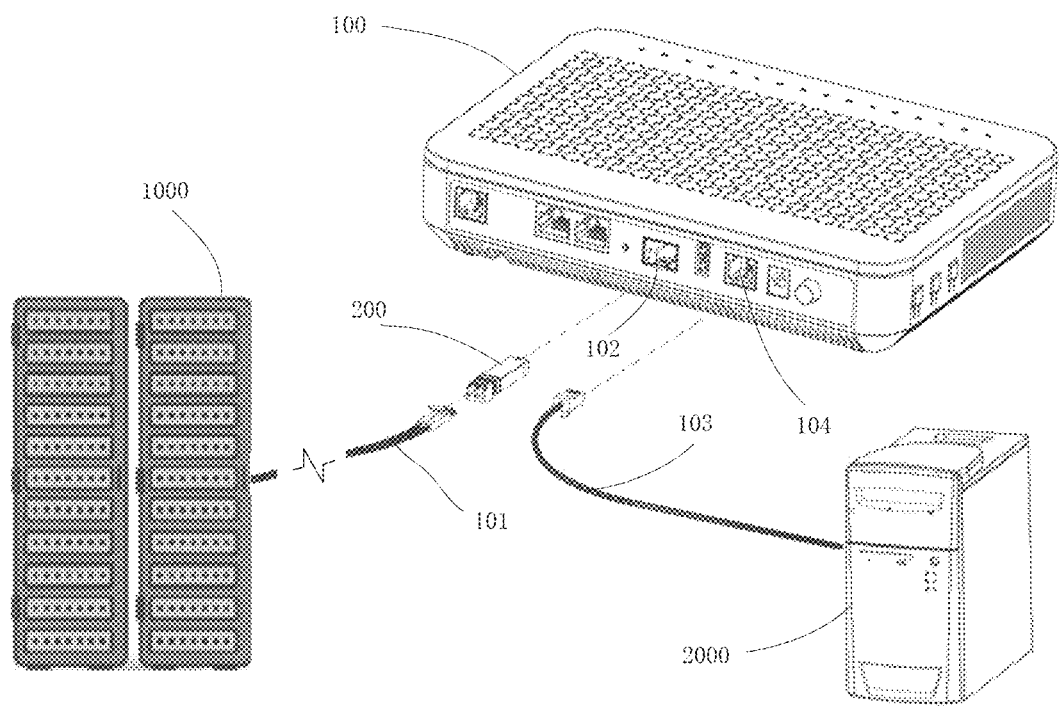
FIG. 1 shows a schematic diagram illustrating a connection relationship of an optical communication terminal.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, features defined with "first" and "second" may explicitly or implicitly include one or more of the features. In the description of the embodiments of the present disclosure, the term "a/the plurality of" means two or more unless otherwise specified.

In the description of some embodiments, the term "coupled" and "connected" and their derivatives may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The use of the phrase "applicable to" or "configured to" herein means an open and inclusive language, which does not exclude devices that are applicable to or configured to perform additional tasks or steps.

As used herein, the term "about", "substantially" or "approximately" includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

In optical communication technology, an optical signal is used to carry information to be transmitted, and the optical signal carrying the information is transmitted to an information processing device such as a computer through an information transmission device such as an optical fiber or an optical waveguide, so as to achieve transmission of the information. Since light has a characteristic of passive transmission when being transmitted through the optical fiber or the optical waveguide, low-cost and low-loss information transmission may be achieved. In addition, a signal transmitted by the information transmission device such as the optical fiber or the optical waveguide is the optical signal, while a signal that may be recognized and processed by the information processing device such as the computer is an electrical signal. Therefore, in order to establish information connection between the information transmission device such as the optical fiber or the optical waveguide and the information processing device such as the computer, interconversion between the electrical signal and the optical signal needs to be achieved.

An optical module implements a function of the interconversion between the optical signal and the electrical signal in the field of optical fiber communication technology. The optical module includes an optical port and an electrical port. The optical module achieves optical communication with the information transmission device such as the optical fiber or the optical waveguide through the optical port. And the optical module achieves electrical connection with an optical network terminal (e.g., an optical modem) through the electrical port. The electrical connection is mainly to achieve power supply, transmission of an I2C signal, transmission of data information and grounding. The optical network terminal transmits the electrical signal to the information processing device such as the computer through a network cable or wireless fidelity (Wi-Fi).

Embodiment 1

FIG. 1 shows a schematic diagram illustrating a connection relationship of an optical communication terminal. As shown in FIG. 1, the optical communication system includes a remote server 1000, a local information processing device 2000, an optical network terminal 100, an optical module 200, an optical fiber 101 and a network cable 103.

One end of the optical fiber 101 is connected to the remote server 1000, and the other end thereof is connected to the optical network terminal 100 through the optical module 200. The optical fiber itself may support long-distance signal transmission, such as several-kilometer (6-kilometer to 8-kilometer) signal transmission. On this basis, infinite-distance transmission may be achieved theoretically if a repeater is used. Therefore, in a typical optical communication system, a distance between the remote server 1000 and the optical network terminal 100 may typically reach several kilometers, tens of kilometers, or hundreds of kilometers.

One end of the network cable 103 is connected to the local information processing device 2000, and the other end thereof is connected to the optical network terminal 100. The local information processing device 2000 is at least one of the followings: a router, a switch, a computer, a mobile phone, a tablet computer or a television.

A physical distance between the remote server 1000 and the optical network terminal 100 is greater than a physical distance between the local information processing device 2000 and the optical network terminal 100. Connection between the local information processing device 2000 and the remote server 1000 is completely by the optical fiber 101 and the network cable 103, and connection between the optical fiber 101 and the network cable 103 is completely by the optical module 200 and the optical network terminal 100.

The optical module 200 includes an optical port and an electrical port. The optical port is configured to access the optical fiber 101, so that a bidirectional optical signal connection is established between the optical module 200 and the optical fiber 101; and the electrical port is configured to access the optical network terminal 100, so that a bidirectional electrical signal connection is established between the optical module 200 and the optical network terminal 100. Interconversion between the optical signal and the electrical signal is achieved by the optical module 200, so that information connection between the optical fiber 101 and the optical network terminal 100 is established. For example, an optical signal from the optical fiber 101 is converted into an electrical signal by the optical module 200 and then the electrical signal is input into the optical network terminal 100, and an electrical signal from the optical network terminal 100 is converted into an optical signal by the optical module 200 and then the optical signal is input into the optical fiber 101. Since the optical module 200 is a tool for achieving the interconversion between the optical signal and the electrical signal, and has no function of processing data, the information does not change in the above photoelectric conversion process.

The optical network terminal 100 includes a housing in a substantially cuboid shape, and an optical module interface 102 and a network cable interface 104 that are disposed on the housing. The optical module interface 102 is configured to access the optical module 200, so that the bidirectional electrical signal connection between the optical network terminal 100 and the optical module 200 is established; and the network cable interface 104 is configured to access the network cable 103, so that a bidirectional electrical signal connection between the optical network terminal 100 and the network cable 103 is established. Connection between the optical module 200 and the network cable 103 is established through the optical network terminal 100. For example, the optical network terminal 100 transmits an electrical signal from the optical module 200 to the network cable 103, and transmits an electrical signal from the network cable 103 to the optical module 200. Therefore, the optical network terminal 100, as a master monitor of the optical module 200, may monitor operation of the optical module 200. In addition to the optical network terminal 100, the master monitor of the optical module 200 may further include an optical line terminal (OLT).

A bidirectional signal transmission channel between the remote server 1000 and the local information processing device 2000 has been established through the optical fiber 101, the optical module 200, the optical network terminal 100 and the network cable 103.

Figure 2:
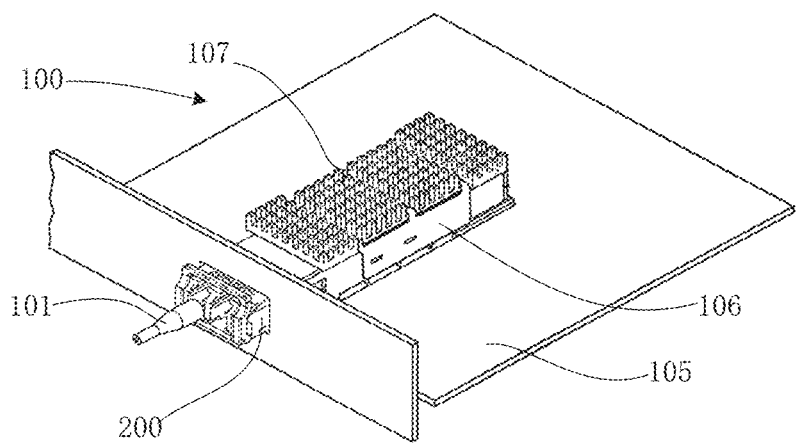
FIG. 2 shows a schematic diagram of a component of an optical network terminal.

FIG. 2 shows a schematic diagram of a component of an optical network terminal according to an embodiment of the present disclosure. As shown in FIG. 2, the optical network terminal 100 has a circuit board 105, and a cage 106 is arranged on a surface of the circuit board 105. Electrical connectors are provided within the cage 106 for connecting to an electrical port, such as a golden finger, of the optical module. A radiator 107 with protrusions such as fins for increasing a heat dissipation area is disposed on the cage 106.

The optical module 200 is inserted into the optical network terminal. Specifically, the electrical port of the optical module is inserted into the electrical connector within the cage 106, while the optical port of the optical module is connected to the optical fiber 101.

The cage 106 is arranged on the circuit board, with the electrical connector on the circuit board being enclosed in the cage, so that the cage is provided with an electrical connector disposed within. The optical module is inserted into the cage and is fixed by the cage. Heat generated by the optical module is conducted to the cage 106, and then is dissipated via the radiator 107 on the cage.

Figure 3:
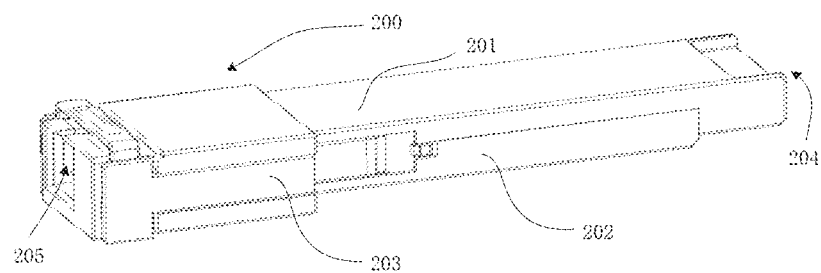
FIG. 3 is a schematic structural diagram of an optical module with a step having two reflective surfaces according to an embodiment of the present disclosure.
Figure 4:
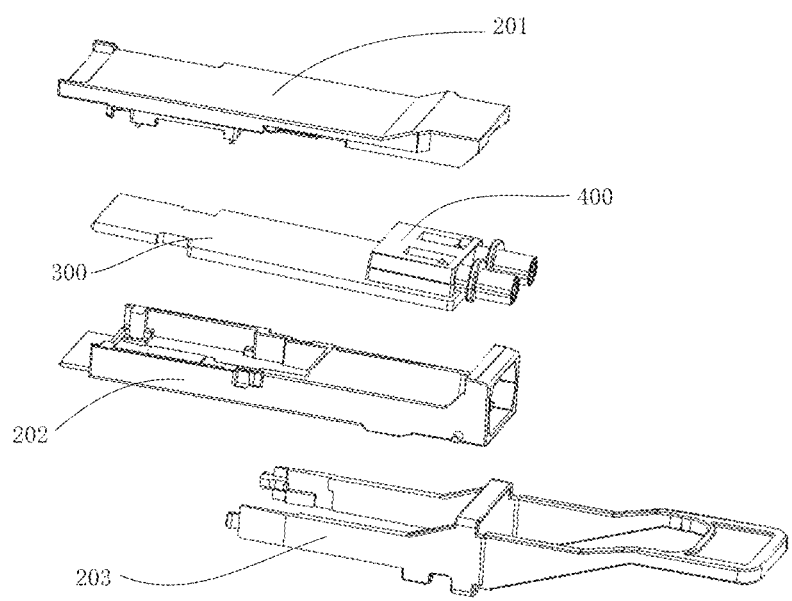
FIG. 4 is an exploded schematic structural diagram of an optical module with a step having two reflective surfaces according to an embodiment of the present disclosure.

FIG. 3 is a schematic structural diagram of an optical module according to an embodiment of the present disclosure. FIG. 4 is an exploded schematic structural diagram of an optical module according to an embodiment of the present disclosure. As shown in FIG. 3 and FIG. 4, an optical module 200 according to the embodiment of the present disclosure includes an upper enclosure 201, a lower enclosure 202, an unlocking part 203, a circuit board 300, and an optical transceiver 400.

The upper enclosure 201 is covered on the lower enclosure 202 to form a chamber with two openings, and an outer contour of the chamber is generally in a cuboid shape. In an embodiment of the present disclosure, the lower enclosure includes a main plate and two side plates arranged at two sides of the main plate and perpendicular to the main plate; the upper enclosure includes a cover plate, where the cover plate is covered on the two side plates of the lower enclosure to form the chamber; the upper enclosure may further include two side walls located at two sides of the cover plate and disposed perpendicular to the cover plate. The two side walls cooperate with the two side plates such that the upper enclosure is covered on the lower enclosure.

Specifically, the two openings of the chamber may be openings at two ends opening along the same direction, or may be two openings in different directions. One of the openings forms an electrical port 204, and golden fingers of the circuit board may extend outwardly from the electrical port 204 and be inserted into a host computer such as the optical network terminal. The other opening forms an optical port 205, is configured to allow accessing of an external fiber to connect the optical transceiver 400, and is located in the chamber.

The way in which the upper enclosure cooperates with the lower enclosure to form an assembly helps to arrange the optical transceiver 400, the circuit board 300, and other devices into the enclosure. The upper enclosure and the lower enclosure form an outermost packaging protective enclosure of the optical module. The upper enclosure and the lower enclosure are generally made of metal materials for promoting electromagnetic shielding and heat dissipation. Generally, the enclosure of the optical module is not made into an integral part. Otherwise, it will be infeasible to install positioning components or heat dissipation/electromagnetic shielding components during assembling of the circuit board and other components, and production automation is not facilitated neither.

The unlocking part 203 is provided at an outer wall of the chamber/lower enclosure 202, to realize a fixed connection between the optical module and the host computer or to release the fixed connection between the optical module and the host computer.

The unlocking part 203 has a clamping part that matches with the cage of the host computer, and the unlocking part may be allowed to move with respect to a surface of the outer wall by pulling a tail end of the unlocking part. The optical module in inserted into the cage of the host computer, and is fixed in the cage of the host computer by the clamping part of the unlocking part. By pulling the unlocking part, the clamping part of the unlocking part moves accordingly, so that a connection relationship between the clamping part and the host computer is changed, thereby releasing a clamping relationship between the optical module and the host computer. In this way, the optical module may be pulled out of the cage of the host computer.

The circuit board 300 is provided with circuit tracings, electronic elements (such as a capacitor, a resistor, a transistor, or an MOS), chips (such as an MCU, a laser driver chip, a limiting amplification chip, a clock data recovery CDR, a power management chip, or a data processing chip DSP), an optical emission chip array, an optical receiver chip array, and the like.

The circuit board is provided with a power supply circuit and a signal circuit. The electrical components of the optical module are connected according to a circuit design via circuit tracings in the circuit board, so as to achieve electrical functions such as power supply, transmission of electrical signals and optical signals, and electrical grounding.

The circuit board is generally a rigid circuit board. The rigid circuit board may further achieve a carrying function due to a relatively hard material thereof. For example, the rigid circuit board may carry a chip stably. When the optical transceiver is located on the circuit board, stable carrying may also be provided by the rigid circuit board. The rigid circuit board may further be inserted into the electrical connector in the cage of the host computer. In an embodiment of the present disclosure, metal pins/gold fingers are formed on a surface of a tail end of the rigid circuit board, for connecting the electrical connector. These all cannot be conveniently implemented by a flexible circuit board.

In some optical modules, a flexible circuit board may also be used to serve as a supplement to the rigid circuit board. The flexible circuit board is generally used in cooperation with the rigid circuit board. For example, the rigid circuit board and the optical transceiver may be connected via a flexible circuit board.

The optical transceiver includes an optical emission part and an optical receiver part that are respectively configured to transmit and receive an optical signal. The optical emission part and the optical receiver part may be combined together, or may be separate from each other.

Figure 5:
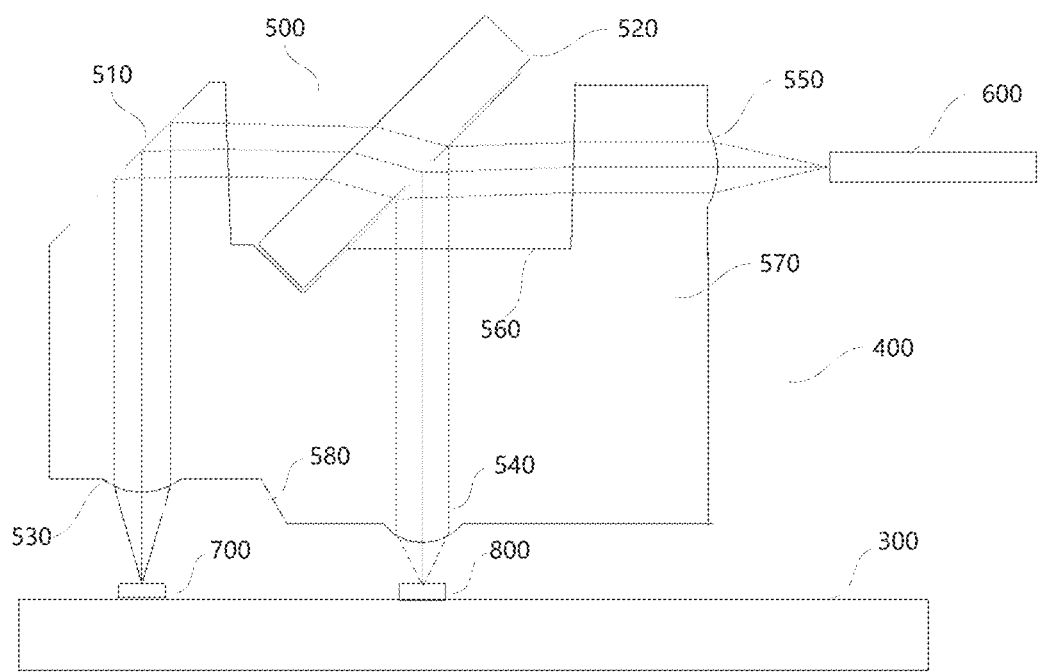
FIG. 5 is a schematic structural diagram of an optical transceiver of an optical module with a step having two reflective surfaces according to an embodiment of the present disclosure.

FIG. 5 is a schematic structural diagram of an optical transceiver 400 of an optical module with a step having two reflective surfaces according to an embodiment of the present disclosure. In the embodiments, the optical transceiver 400 is not a specific optical device, but is a general term for a series of optical devices.

The optical transceiver 400 is disposed on a surface of a circuit board 300, for receiving and transmitting an optical signal. Specifically, the optical transceiver 400 includes a lens assembly 500, an optical fiber array 600, an optical emission chip array 700, and an optical receiver chip array 800.

The optical emission chip array 700 is attached on the surface of the circuit board 300 at a position corresponding to emission lens in an emission lenses array 530. The optical emission chip array 700 is configured to emit an optical signal. An emitting laser chip in the optical emission chip array 700 has a light-emitting surface. During a manufacturing and assembling process, it needs to be ensured that a focus point of the emission lenses array 530 falls on the light-emitting surface. In the embodiments, a height of the optical emission chip array 700 is consistent with that of the optical receiver chip array 800. In other words, the light-emitting surface of the emitting laser chip and a light sensitive surface of a receiving detector chip in the optical receiver chip array 800 have the same height and are located in a same plane.

The optical receiver chip array 800 is attached on the surface of the circuit board 300, and is corresponding to receiving lens in a receiving lenses array 540. The optical receiver chip array 800 is configured to receive an optical signal transmitted by the optical transceiver 400. In the embodiments, the optical receiver chip array 800 has a light sensitive surface, for detecting the received optical signal. It should be noted that in the embodiments, the height of the optical receiver chip array 800 is consistent with that of the optical emission chip array 700. In other words, the light-emitting surface of the emitting laser chip and the light sensitive surface of the receiving detector chip have a same height and are located in a same plane.

The optical fiber array 600 is disposed at a side wall of the lens assembly 500, corresponds to an optical fiber lenses array 550, and is configured to receive converged light from the optical fiber lenses array 550, or to transmit optical signals received by the optical module to the optical fiber lenses array 550. Distances between end portions of all optical fibers in the optical fiber array and the optical fiber lenses in the corresponding optical fiber lenses array 550 are consistent. This is determined by a manufacturing process. In an actual manufacturing process, the optical fiber array is a standard part. If the optical fiber lenses array 550 is not a standard part, the manufacturing process thereof is not unified and the thickness of respective lenses is different, then faces of various optical fiber lenses cannot be in a same vertical plane, which will further cause focal points of various optical fiber lenses to fall in different vertical planes. Consequently, light from each optical fiber lens in the optical fiber lenses array 550 cannot be accurately focused on the end portion of each optical fiber in the optical fiber array 600.

It should be noted that it is unrealistic to individually adjust the distance between each optical fiber lens and the end portion of the optical fiber in the corresponding optical fiber array 600 in the actual manufacturing process. Therefore, each optical fiber lenses corresponding to respective optical fiber in the optical fiber array 600 is of the same specification. To be specific, it may be considered that all the optical fiber lenses have a same focal length and a same attachment-surface level, and all the focal points fall in a same vertical plane.

Figure 8:
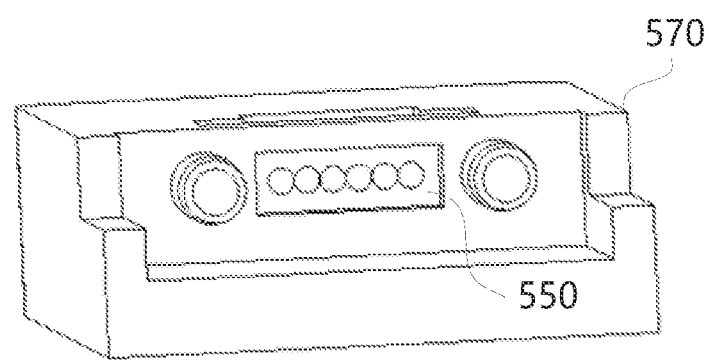
FIG. 8 is a schematic positional diagram of an optical fiber lenses array of an optical module with a step having two reflective surfaces according to an embodiment of the present disclosure.
Figure 9:
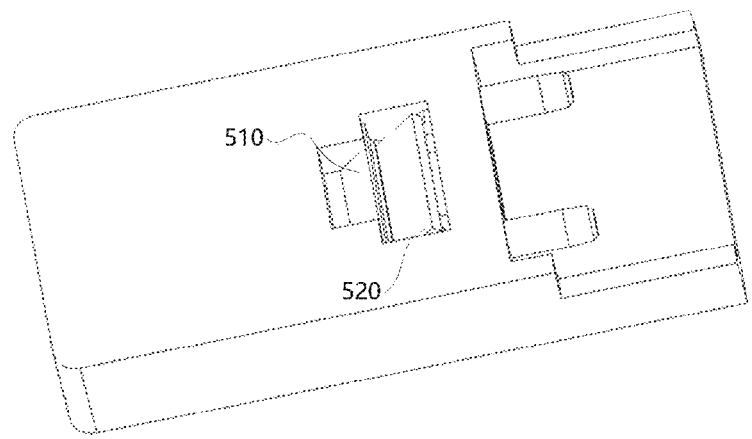
FIG. 9 is a schematic positional diagram of reflective surfaces of an optical module with a step having two reflective surfaces according to an embodiment of the present disclosure.

FIG. 8 is a schematic positional diagram of an optical fiber lenses array of an optical module with a step having two reflective surfaces according to an embodiment of the present disclosure. FIG. 9 is a schematic positional diagram of reflective surfaces of an optical module with a step having two reflective surfaces according to an embodiment of the present disclosure. The optical fiber lenses in the optical fiber lenses array 550 have a same specification and are regularly arranged, and the optical fiber array 600 is correspondingly and regularly arranged. Therefore, between the optical fiber lenses array 550 and the optical fiber array 600, transmitted light or received light may be accurately coupled.

The lens assembly 500 is provided on the surface of the circuit board 300 in a capped/covered way. The lens assembly is disposed above the circuit board 300 and forms a cavity with the circuit board. The cavity is configured to seal the optical emission chip array and the optical receiver chip array. The lens assembly 500 may be further configured to carry other optical devices, and provide passage for an emission optical path and a receiving optical path in the optical module.

The lens assembly 500 includes a first reflective surface 510, a second reflective surface 520, the emission lenses array 530, the receiving lenses array 540, the optical fiber lenses array 550, a groove 560, a body 570, and a step 580.

The body 570 is a main part of the lens assembly 500. The step 580 is disposed at a bottom portion of the body. The step is consisted of two step surfaces with different heights at the bottom portion of the body 570, where one step surface is configured for arranging the emission lenses array 530, and the other step surface is configured for arranging the receiving lenses array 540.

In an actual manufacturing process of the optical module, the body 570 is formed with grooves, bevels, or openings during an integral-molding manufacturing process, for correspondingly arranging the emission lenses array 530, the receiving lenses array 540, the optical fiber lenses array 550, the first reflective surface 510, and the second reflective surface 520. In other words, the foregoing optical devices are formed in the integral-molding manufacturing process of the body 570.

In some implementations, the openings, the grooves, and the bevels in the body 570 for mounting and fixing the lens arrays and reflective surfaces may also be individually processed after the body is integrally manufactured. Correspondingly, the respective lens arrays and reflective surfaces may also be mounted and fixed individually.

The step 580 is composed of two step surfaces with different heights at the bottom portion of the body 570, and is configured to compensate for a difference between focal lengths of the emission lenses array 530 and the receiving lenses array 540. In this way, a focal point of the emission lenses array 530 can accurately fall on an emission surface of the optical emission chip array 700, and a focal point of the receiving lenses array 540 can accurately fall on a light sensitive surface of the optical receiver chip array 800.

The emission lenses array 530 is an array including a plurality of emission lenses with a same specification, is disposed at a step surface provided at the bottom portion of the body 570, and is configured for realizing an optical coupling with the optical emission chip array 700, so that light emitted by the optical emission chip array 700 may be converted into a collimated beam and is incident to the first reflective surface 510.

A cavity is formed between the emission lenses array 530 and the optical emission chip array 700, so as to ensure that the focal point of the emission lenses array 530 may accurately fall on the optical emission chip array 700.

It should be noted that the emission lenses array 530 and the receiving lenses array 540 are located in different levels/planes. To be specific, it may be considered that the bottom portion of the body 570 is composed of at least two planes with different levels. Two step surfaces with different levels are formed at the bottom portion of the body 570. The emission lenses array 530 and the receiving lenses array 540 are respectively provided in the integral molding process of the body 570. The emission lenses array 530 is configured for converting the light emitted by the optical emission chip array 700 into a collimated beam to be incident to the first reflective surface 510.

The emission lenses array 530 is arranged on a step surface at a side of the step 580 that is located at the bottom portion of the body 570. The emission lenses array 530 converts the light emitted by the optical emission chip array 700 into a collimated beam to be incident to the first reflective surface 510.

The receiving lenses array 540 is an array including a plurality of receiving lenses with a same specification, is arranged at the other step surface at the other side of the step 580 that is located at the bottom portion of the body 570, and is configured for realizing an optical coupling with the optical receiver chip array 800, so that a collimated beam from the second reflective surface 520 may be converged onto the light sensitive surface of the optical receiver chip array 800.

A cavity is formed between the receiving lenses array 540 and the optical receiver chip array 800, so as to ensure that the focal point of the receiving lenses array 540 may accurately fall on the optical receiver chip array 800.

It should be noted that the emission lenses array 530 and the receiving lenses array 540 are located in different planes. In other words, it may be considered that specifications of the receiving lens and the emission lens are different. The receiving lenses array 540 is configured to enable the collimated beam from the second reflective surface 520 to be converged onto the optical receiver chip array 800.

The receiving lenses array 540 is disposed on the bottom surface of the body 570. The receiving lenses array 540 converts the collimated beam reflected by the second reflective surface 520 into a converged light focusing on the light sensitive surface of the optical receiver chip array 800.

Figure 11:
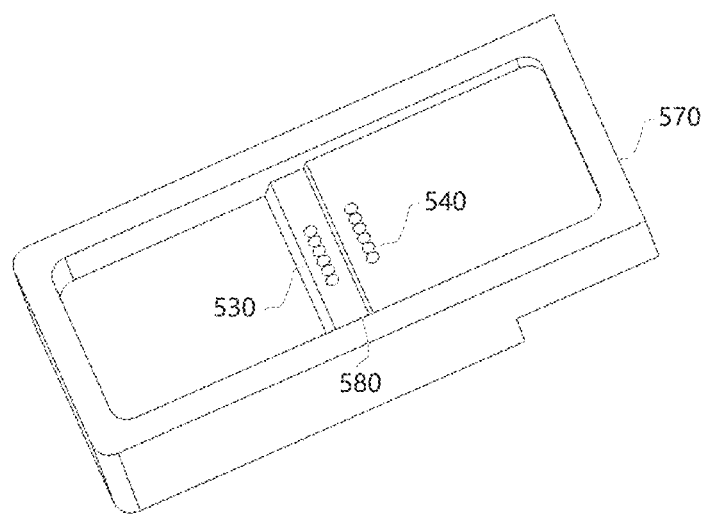
FIG. 11 is a schematic diagram of an emission lenses array and an receiving lenses array of an optical module according to an embodiment of the present disclosure.

It should be noted that, when observing from outside of the lens assembly 500, the emission lenses array 530 and the receiving lenses array 540 are arranged in a front-rear way, as shown in FIG. 11. It may also be considered that the emission lenses array 530 and the receiving lenses array 540 are located in different planes/levels provided by the step 580. Moreover, specifications of the emission lenses array 530 and the receiving lenses array 540 are different. In other words, it may be considered that the focal lengths of the emission lenses array 530 and the receiving lenses array 540 are different.

The optical fiber lenses array 550 is an array including a plurality of optical fiber lenses with a same specification, is disposed on a side wall of the body 570, and is configured for realizing an optical coupling with the optical fiber array 600.

Figure 10:
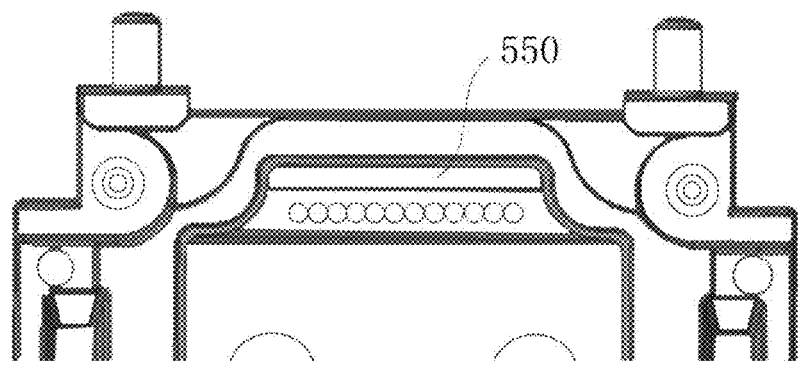
FIG. 10 is a schematic diagram of an optical fiber lenses array of an optical module with a step having two reflective surfaces according to an embodiment of the present disclosure.

Referring to FIG. 10, the optical fiber lenses array 550 may be considered as an array including a plurality of optical fiber lenses with a same specification. The optical fiber lenses 550 is disposed at a light outlet of the body 570, converts the collimated beam from the first reflective surface 510 into a converged light to be transmitted to the optical fiber array 600, and converts light from the optical fiber array 600 into a collimated beam and transmits the same to the second reflective surface 520.

The orderly arranged optical fiber array 600 is correspondingly disposed with respect to the optical fiber lenses array 550. The optical fiber array is orderly and regularly arranged on an outer wall of the lens assembly 500. Some optical fibers are configured to receive light from the optical module, and some optical fibers are configured to transmit external light to the optical module.

In some embodiments of the present disclosure, the optical fiber lenses array 550 is disposed on a side wall at an upper portion at a right end of the body 570, where one side of the optical fiber lenses array 550 receives the collimated beam from the first reflective surface 510 and converts the collimated beam into converged light. The converged light forms a light spot on the optical fiber array 600.

It should be noted that regarding the emission lenses array, the receiving lenses array, the optical fiber lenses array, and the optical fiber array described in the present disclosure, a quantity of the lenses in the respective arrays may be one, or may be multiple in one row, or multiple in one column, or several rows and several columns, or a combination thereof.

The groove 560 is disposed at a top portion of the lens assembly 500, and includes a first groove and a second groove, as shown in FIG. 5.

The first groove is disposed above the emission lenses array 530 and is at the top portion of the lens assembly 500. It may also be considered that the first groove is at a top portion of the body 570 because the body 570 is the main body of the lens assembly 500. A first bevel is formed at a bottom surface of the first groove. The first bevel is located at the top portion of the body 570. In other words, it may be considered that the first bevel is a portion of the body 570. The first reflective surface 510 is formed by the first bevel of the first groove. The first bevel, that is, the first reflective surface 510, may reflect a collimated beam from the emission lenses array 530 to the optical fiber lenses array 550.

The first reflective surface 510 is disposed above the emission lenses array 530, and is a bevel formed at the top portion of the body 570. The first bevel is formed above the emission lenses array 530 during an integral-molding manufacturing process of the lens assembly 500. The first bevel may be configured to reflect light. In the embodiments, the first bevel forms the first reflective surface 510, as shown in FIG. 5. The first reflective surface 510 is configured to reflect the collimated beam from the emission lenses array 530 toward a light filter (which forms the second reflective surface 520); the collimated beam is then refracted by and passes through the light filter, and is coupled to the optical fiber lenses array 550.

The first reflective surface 510 is configured to establish an optical connection between the emission lenses array 530 and the optical fiber lenses array 550. It should be noted that in the emission optical path, lenses in the emission lenses array 530 are in one-to-one correspondence to the lenses in the optical fiber lenses array 550, thereby ensuing coupling of light.

The second groove is disposed at the top portion of the lens assembly 500, and is configured for arranging the light filter. The light filter refracts light from the first reflective surface toward the optical fiber lenses array, or reflects light from the optical fiber lenses array toward the receiving lenses array.

The second groove is disposed above the body 570 and is at the top portion of the body 570. The light filter arranged in the second groove provides a second bevel, and the second bevel forms the second reflective surface 520.

The light filter separates two light paths that come from two different directions but share a same path. According to a difference in wavelengths of light from two sides of the light filter, the light with different wavelengths is either reflected or refracted.

It may also be considered that, for the light filter, when light within a certain wavelength range passes through, total reflection may occur; and when light with another wavelength range passes through, refraction may occur.

A surface, of the light filter, that faces towards the first reflective surface 510 is configured to refract the collimated beam from the first reflective surface to pass through the light filter and couple the collimated beam to the optical fiber lenses array 550. The other surface of the light filter is the second reflective surface, and is configured to establish an optical connection between the optical fiber lenses array 550 and the receiving lenses array 540. The light filter causes a collimated beam from the optical fiber lenses array 550 to be totally reflected at the second reflective surface 520. It may be considered that the second reflective surface 520 is a surface of the light filter.

In some embodiments, the foregoing characteristic structure capable of generating total reflection is given to the surface of the light filter that face towards the optical fiber lenses array 550, to form the second reflective surface 520, as shown in FIG. 5; and a characteristic structure capable of generating refraction is given to a surface of the light filter that face towards the first reflective surface 510.

The second reflective surface 520 has a rectangular configuration, is disposed above the receiving lenses array 540, and is configured to reflect the collimated beam from the optical fiber lenses array 550 to the receiving lenses array 540. It should be noted that in the receiving optical path, lenses in the optical fiber lenses array 550 are in one-to-one correspondence with the lenses in the receiving lenses array 540 (where collimated light is reflected by the second reflective surface 520 to the receiving lenses array 540 that receives the collimated beam), thereby ensuing coupling of light.

In some embodiments, a limiting notch is disposed at a bottom portion of the second groove. The second bevel, that is, the second reflective surface 520 (the light filter) may be disposed against the limiting notch, thereby enhancing stability of the optical device within the lens assembly.

It should be noted that the first reflective surface 510 and the second reflective surface 520 are arranged on the lens assembly 500 in a front-rear way. A front-rear direction in the foregoing front-rear arrangement refers to a light propagation direction in the emission optical path or the receiving optical path.

In some embodiments, an intersection point of an axis of the receiving lenses array 540 and the second reflective surface 520 coincides with an intersection point of an axis of the optical fiber lenses array 550 and the second reflective surface 520. In this case, the collimated beam from the optical fiber lenses array 550 may be entirely reflected onto the receiving lenses array 540, thereby avoiding loss of the optical signal. It should be noted that an intersection point of an axis of the emission lenses array 530 and the first reflective surface 510 may not coincide with an intersection point of the axis of the optical fiber lenses array 550 and the first reflective surface 510, because a collimated beam from the optical emission chip array 700 is refracted at the light filter (the second reflective surface 520 is disposed on the light filter) after being reflected by the first reflective surface 510, and is finally transmitted to the optical fiber lenses array 550 as a collimated beam. The beam is slightly displaced in a vertical direction overall, as shown in FIG. 5.

In some embodiments, the first reflective surface 510 and the second reflective surface 520 may be set as bevels at an angle of 45 degrees.

In some embodiments, the optical emission chip array 700 and the optical receiver chip array 800 may have a same height. To be specific, the emission surface of the optical emission chip array 700 and the light sensitive surface of the optical receiver chip array 800 have a same height and are located in a same plane/level. The emission lenses array 530 and the receiving lenses array 540 may have different specifications. In other words, the emission lens and the receiving lens have different focal lengths.

When a focal length of the emission lenses array 530 is greater than that of the receiving lenses array 540, provision of the step 580 causes a distance between the step surface at which the emission lenses array 530 is located and the circuit board 300 to be greater than a distance between the step surface at which the receiving lenses array 540 is located and the circuit board 300. In this case, the focal point of the emission lenses array 530 can also accurately fall on the emission surface of the optical emission chip array 700.

When the focal length of the emission lenses array 530 is smaller than that of the receiving lenses array 540, provision of the step 580 causes a distance between the step surface at which the emission lenses array 530 is located and the circuit board 300 to be smaller than a distance between the step surface at which the receiving lenses array 540 is located and the circuit board 300. In this case, the focal point of the receiving lenses array 540 can also accurately fall on the light sensitive surface of the optical receiving chip array 800.

In some embodiments, optical elements in the lens assembly in the present disclosure, such as the emission lenses array 530, the receiving lenses array 540, and the optical fiber lenses array 550, may be made of glass materials or may be made of plastic materials.

In some embodiments, a plane in which the optical fiber lenses array 550 is located is perpendicular to the planes in which the emission lenses array 530 and the receiving lenses array 540 are located. An included angle between the first reflective surface 510 and the plane in which the optical fiber lenses array 550 is arranged is equal to an included angle between the second reflective surface 520 and the plane in which the receiving lenses array 540 is arranged, and the included angle may be set to be a 45-degree angle, where a schematic diagram for a cavity within the optical module is shown in FIG. 5.

In view of the above, when the optical receiver chip array 800 and the optical emission chip array 700 have a same height, if the focal length of the emission lenses array 530 is greater than that of the receiving lenses array 540, a distance between the emission lenses array 530 and the optical emission chip array 700 needs to be increased. To be specific, the emission lenses array 530 is moved for a certain distance in a vertical direction, so that the focal point of the emission lenses array 530 can accurately fall on the emission surface of the optical emission chip array 700. In this case, the step 580 may be formed, and a height of the step is equal to a difference between the focal lengths of the emission lenses array 530 and the receiving lenses array 540.

When the focal length of the emission lenses array 530 is smaller than that of the receiving lenses array 540, the step may also be set with the same method and structure, and details will not be described in the present disclosure.

Figure 12:
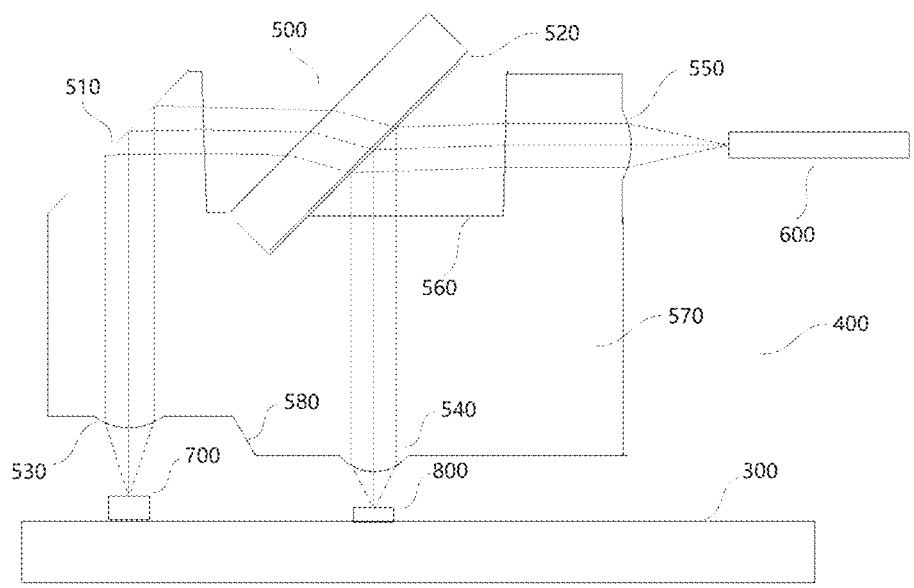
FIG. 12 is a schematic structural diagram of an optical transceiver of another optical module according to an embodiment of the present disclosure.

FIG. 12 is a schematic structural diagram of an optical transceiver 400 of an optical module according to some embodiments of the present disclosure.

This embodiment is based on the embodiments shown in FIG. 5 to FIG. 11, similar description will not be repeated, but differences will be described as follows.

The optical emission chip array 700 is attached on the surface of the circuit board 300, corresponding to the emission lens in the emission lenses array 530. The optical emission chip array 700 is configured to emit an optical signal, and has a light-emitting surface. During a manufacturing and assembling process, it needs to be ensured that the focus point of the emission lenses array 530 falls on the light-emitting surface. In the embodiments, the height of optical emission chip array 700 is greater than that of the optical receiver chip array 800. In other words, the light-emitting surface of the emitting laser chip and the light sensitive surface of the receiving detector chip have different heights and are located in different planes/levels.

The optical receiver chip array 800 is attached on the surface of the circuit board 300, corresponding to the receiving lens in the receiving lenses array 540. The optical receiver chip array 800 is configured to receive an optical signal transmitted by the optical transceiver 400. In the embodiments, the optical receiver chip array 800 has a light sensitive surface, for detecting the received optical signal. It should be noted that in the embodiments, the height of the optical receiver chip array 800 is not consistent with that of the optical emission chip array 700. In other words, the light-emitting surface of the emitting laser chip and the light sensitive surface of the receiving detector chip have different heights and are located in different planes/levels.

In the embodiments, the specifications of the emission lenses array 530 and the receiving lenses array 540 are the same. That is to say, it may be considered that the emission lens and the receiving lens have focal lengths with a same value.

The step 580 is consisted of two step surfaces with different heights at the bottom portion of the body 570, and is configured to compensate for a height difference between the optical receiver chip array 800 and the optical emission chip array 700. In this way, the focal point of the emission lenses array 530 can fall on the emission surface of the optical emission chip array 700, and the focal point of the receiving lenses array 540 can fall on the light sensitive surface of the optical receiver chip array 800.

In a possible embodiment, the optical emission chip array 700 and the optical receiver chip array 800 have different heights. To be specific, the light-emitting surface of the emitting laser chip and the light sensitive surface of the receiving detector chip also have different heights and are located in different planes/levels. The emission lenses array 530 and the receiving lenses array 540 have a same specification. In other words, the emission lens and the receiving lens have a same focal length.

When the height of the optical emission chip array 700 is greater than that of the optical receiver chip array 800, the provision of the step 580 causes a distance between the step surface at which the emission lenses array 530 is located and the circuit board 300 to be greater than a distance between the step surface at which the receiving lenses array 540 is located and the circuit board 300. In this case, the focal point of the emission lenses array 530 can also accurately fall on the emission surface of the optical emission chip array 700.

When the height of the optical emission chip array 700 is smaller than that of the optical receiver chip array 800, the provision of the step 580 causes a distance between the step surface at which the emission lenses array 530 is located and the circuit board 300 to be smaller than a distance between the step surface at which the receiving lenses array 540 is located and the circuit board 300. In this case, the focal point of the receiving lenses array 540 can accurately fall on the light sensitive surface of the optical receiver chip array 800.

In view of the above, when the focal lengths of the emission lenses array 530 and the receiving lenses array 540 are the same, that is, when specifications of the two types of lenses are the same, taking the circuit board as a reference surface, if the height of the optical emission chip array 700 is greater than that of the optical receiver chip array 800, a distance between the emission lenses array 530 and the circuit board 300 needs to be increased. To be specific, the emission lenses array 530 is moved for a certain distance in a vertical direction, so that the focal point of the emission lenses array 530 can accurately fall on the emission surface of the optical emission chip array 700. In this case, the step 580 will be formed, and the height of the step is equal to a height difference between the optical emission chip array 700 and the optical receiver chip array 800.

Taking the circuit board as a reference surface, when the height of the optical emission chip array 700 is smaller than that of the optical receiver chip array 800, the step may also be provided by the same method and structure, and details will not be described in the present disclosure.

Figure 13:
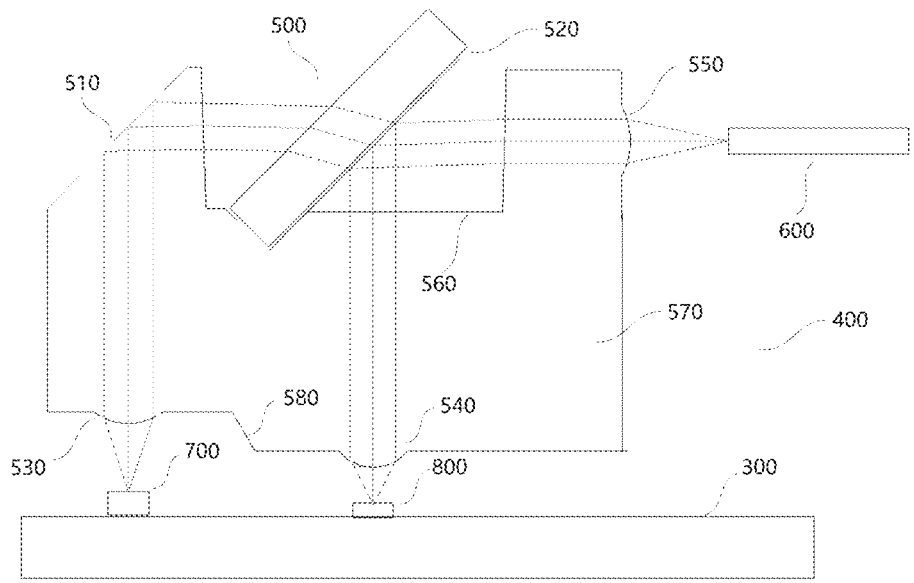
FIG. 13 is a schematic structural diagram of an optical transceiver of another optical module according to an embodiment of the present disclosure.

FIG. 13 is a schematic structural diagram of an optical transceiver 400 of an optical module according to some embodiments of the present disclosure.

This embodiment is based on the embodiments shown in FIG. 5 to FIG. 11, similar description will not be repeated, but differences will be described as follows.

The optical emission chip array 700 is attached on the surface of the circuit board 300, corresponding to the emission lens in the emission lenses array 530. The optical emission chip array 700 is configured to emit an optical signal, and has a light-emitting surface. During a manufacturing and assembling process, it needs to be ensured that the focus point of the emission lenses array 530 falls on the light-emitting surface. In the embodiments, the height of optical emission chip array 700 is greater than that of the optical receiver chip array 800. In other words, the light-emitting surface of the emitting laser chip and the light sensitive surface of the receiving detector chip have different heights and are located in different planes/levels.

The optical receiver chip array 800 is attached on the surface of the circuit board 300, corresponding to the receiving lens in the receiving lenses array 540. The optical receiver chip array 800 is configured to receive an optical signal transmitted by the optical transceiver 400. In the embodiments, a receiving detection chip in the optical receiver chip array 800 has a light sensitive surface, for detecting the received optical signal. It should be noted that in the embodiments, the height of the optical receiver chip array 800 is not consistent with that of the optical emission chip array 700. In other words, the light-emitting surface of the emitting laser chip and the light sensitive surface of the receiving detector chip have different heights and are located in different planes/levels.

In the embodiments, the specifications of the emission lenses array 530 and the receiving lenses array 540 also are different. To be specific, it may be considered that the emission lens and the receiving lens have focal lengths with different values.

The step 580 is consisted of two step surfaces with different heights at the bottom portion of the body 570, and is configured to compensate for a height difference generated by a sum of the focal lengths of the optical receiver chip array 800 and the receiving lenses array 540 and a sum of the focal lengths of the optical emission chip array 700 and the emission lenses array 530. In this way, the focal point of the emission lenses array 530 can fall on the emission surface of the optical emission chip array 700, and the focal point of the receiving lenses array 540 can fall on the light sensitive surface of the optical receiver chip array 800.

When a sum of the height of the optical emission chip array 700 and the focal length of the emission lenses array 530 is greater than a sum of the height of the optical receiver chip array 800 and the focal length of the receiving lenses array 540, the provision of the step 580 causes a distance between the step surface at which the emission lenses array 530 is located and the circuit board 300 to be greater than a distance between the step surface at which the receiving lenses array 540 is located and the circuit board 300. In this case, the focal point of the emission lenses array 530 can accurately fall on the emission surface of the optical emission chip array 700.

When the sum of the height of the optical emission chip array 700 and the focal length of the emission lenses array 530 is smaller than the sum of the height of the optical receiver chip array 800 and the focal length of the receiving lenses array 540, the provision of the step 580 causes the distance from the step surface at which the emission lenses array 530 is located and the circuit board 300 to be smaller than the distance between the step surface at which the receiving lenses array 540 is located and the circuit board 300. In this case, the focal point of the receiving lenses array 540 can accurately fall on the light sensitive surface of the optical receiver chip array 800.

Figure 14:
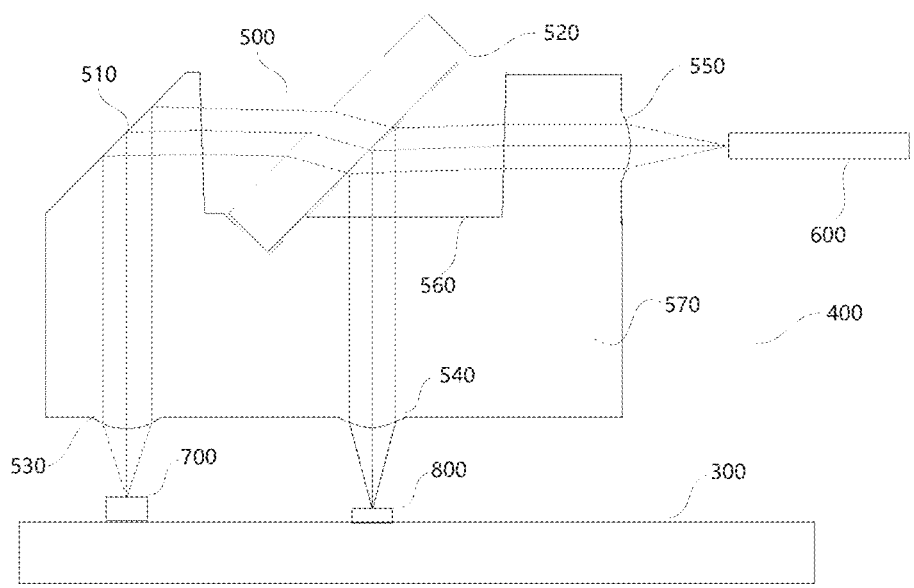
FIG. 14 is a schematic structural diagram of an optical transceiver of another optical module according to an embodiment of the present disclosure.

FIG. 14 is a schematic structural diagram of an optical transceiver 400 of an optical module according to some embodiments of the present disclosure.

This embodiment is based on the embodiments shown in FIG. 5 to FIG. 11, similar description will not be repeated, but differences will be described as follows.

The optical emission chip array 700 is attached on the surface of the circuit board 300, corresponding to the emission lens in the emission lenses array 530. The optical emission chip array 700 is configured to emit an optical signal, and has a light-emitting surface. During a manufacturing and assembling process, it needs to be ensured that the focus point of the emission lenses array 530 falls on the light-emitting surface. In the embodiments, the height of optical emission chip array 700 is greater than that of the optical receiver chip array 800. In other words, it may be considered that the light-emitting surface of the emitting laser chip and the light sensitive surface of the receiving detector chip have different heights and are located in different planes/levels.

The optical receiver chip array 800 is attached on the surface of the circuit board 300, corresponding to the receiving lens in the receiving lenses array 540. The optical receiver chip array 800 is configured to receive an optical signal transmitted by the optical transceiver 400. In the embodiments, the optical receiver chip array 800 has a light sensitive surface, for detecting the received optical signal. It should be noted that in the embodiments, the height of the optical receiver chip array 800 is not consistent with that of the optical emission chip array 700. In other words, the light-emitting surface of the emitting laser chip and the light sensitive surface of the receiving detector chip have different heights and are located in different planes/levels.

In the embodiments, the specifications of the emission lenses array 530 and the receiving lenses array 540 are also different, and the focal length of the emission lenses array 530 is smaller than that of the receiving lenses array 540.

In the embodiment, there is no step 580 provided at the bottom surface of the body 570. In other words, it may be considered that the emission lenses array 530 and the receiving lenses array 540 are located in a same plane.

When the height of optical emission chip array 700 is greater than that of the optical receiver chip array 800, the focal length of the emission lenses array 530 is smaller than that of the receiving lenses array 540, and the foregoing difference in focal lengths corresponds to the height difference between the optical emission chip array 700 and the optical receiver chip array 800, the focal point of the emission lenses array 530 falls on the emission surface of the optical emission chip array 700, and the focal point of the receiving lenses array 540 falls on the light sensitive surface of the optical receiver chip array 800.

When the height of optical emission chip array 700 is smaller than that of the optical receiver chip array 800, the focal length of the emission lenses array 530 is set to be greater than that of the receiving lenses array 540, and the foregoing difference in focal lengths corresponds to the height difference between the optical emission chip array 700 and the optical receiver chip array 800, the focal point of the emission lenses array 530 falls on the emission surface of the optical emission chip array 700, and the focal point of the receiving lenses array 540 falls on the light sensitive surface of the optical receiver chip array 800.

The embodiments are based on the structure of the optical module shown in FIG. 3, and principles of light spots formed by the emission optical path and the receiving optical path of the optical module, as well as the height of the step 580, will be described in detail below.

Figure 6:
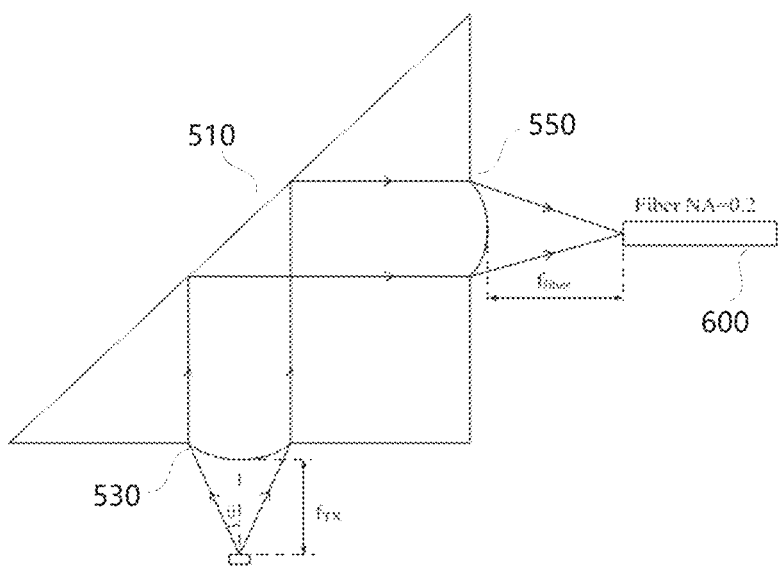
FIG. 6 is a schematic diagram of an emission optical path of an optical transceiver of an optical module according to an embodiment of the present disclosure.

Referring to the schematic diagram of the emission optical path of the optical transceiver 400 in FIG. 6, light emitted by the optical emission chip array 700 is incident to the emission lenses array 530. The emission lenses array 530 changes the light into a collimated beam to be incident to the first reflective surface 510. The first reflective surface reflects the collimated beam to the light filter. The collimated beam is refracted by and passes through the light filter (and pass through the second reflective surface 520), and then is coupled to the optical fiber lenses array 550. The optical fiber lenses array 550 may convert the collimated beam passing through the second reflective surface 520 into converged light. The converged light may form a first light spot in the optical fiber in the corresponding optical fiber array 600, and a diameter of the first light spot is represented by so.

Figure 7:
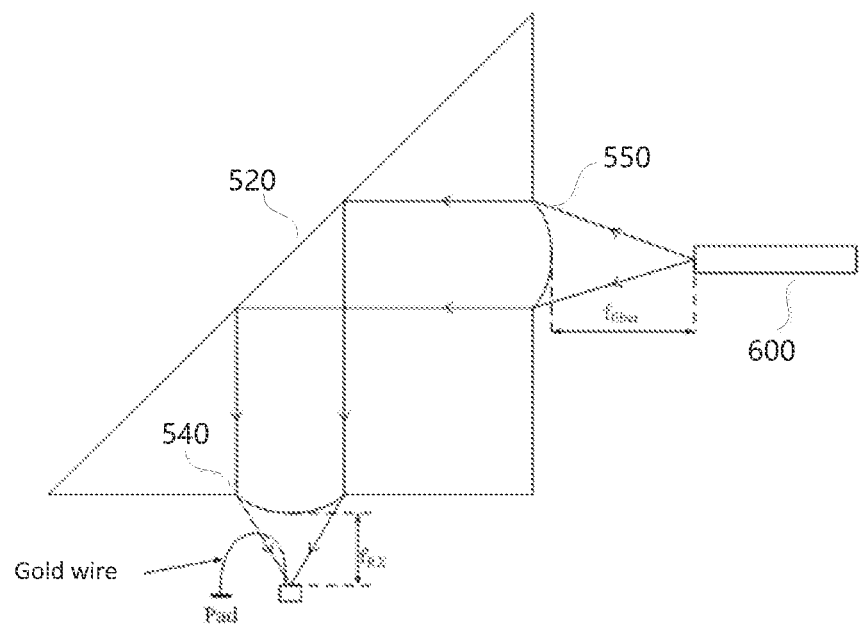
FIG. 7 is a schematic diagram of a receiving optical path of an optical transceiver of an optical module according to an embodiment of the present disclosure.

Referring to the schematic diagram of the receiving optical path of the optical transceiver 400 in FIG. 7, the optical fiber array 600 corresponding to the optical fiber lenses array 550 transmits received light towards the optical fiber lenses array. The optical fiber lenses array 550 converts the received light into a collimated beam, and the collimated beam is reflected to the receiving lenses array 540 by the second reflective surface 520. The receiving lenses array converts the collimated beam into converged light, where the converged light is focused on the light sensitive surface of the optical receiver chip array 800 and forms a second light spot, and a diameter of the second light spot is represented by $S_2$.

For a 10G optical module, an effective light-receiving area of a PD (photodiode) is relatively large, which is usually about 60 μm. Therefore, the second light spot may be adaptively larger; for example, $S_2$ may be set to about 40 μm. However, for a 25G/100G optical module, an effective light-receiving area of a PD is relatively small, which is usually about 40 μm. In this case, it is required that the diameter $S_2$ of the second light spot is merely about 20 μm. Such a requirement may result in a relatively large first light spot $S_0$ formed in the optical fiber. As a result, difficulty in the bonding process is increased and coupling efficiency of the optical fiber becomes very low.

In the embodiments of the present disclosure, to effectively resolve a problem of mutual constraints between $S_0$ and $S_2$, the step 580 is disposed on the bottom surface of the body 570 where the receiving lenses array 540 is located, so that the receiving lenses array 540 and the emission lenses array 530 are not on a same step surface/level, as shown in FIG. 5 and FIG. 11.

The height Δh of the step serves to compensate for a difference between the distance from the emission lenses array 530 to the optical emission chip array 700 and the distance from the receiving lenses array 540 to the optical receiver chip array 800. In this way, $f_{TX}$ and $f_{RX}$ with different sizes may be designed, so as to obtain ideal values of the $S_0$ and the $S_2$.

First, the focal length $f_{fiber}$ of the optical fiber lenses array 550 is determined, and the following formula is obtained according to an optical geometric relationship:

$$2 \cdot f_{fiber} \cdot NA \leq D,$$

where, if a numerical aperture of the optical fiber satisfies NA=0.2 (the numerical aperture is a dimensionless value), and the diameter of the lens satisfies D=0.25 mm, it is obtained that a value range of the focal length $f_{fiber}$ of the optical fiber lenses array 550 satisfies the following formula:

$$f_{fiber} \leq 0.625 \text{ mm}$$

Second, the focal length $f_{TX}$ of the emission lenses array 530 is determined. In actual manufacturing process of the optical module, a selection of emitting lasers is very limited. A half emission angle of an emitting laser in the optical emission chip array 700 is represented by θ; generally, for an emitting laser used in the optical module, a value range of θ is from 13° to 19°. In the embodiments, the half emission angle of the emitting laser satisfies θ=13°, and the following formula may be obtained according to the optical geometric relationship:

$$2 \cdot f_{TX} \cdot \tan \theta \leq D$$

where, if the diameter of the lens satisfies D=0.25 mm, a value range of the focal length $f_{TX}$ of the emission lenses array 530 will satisfy the following formula:

$$f_{TX} \leq 0.541 \text{ mm}$$

Subsequently, taking the coupling efficiency of the optical fiber, the distance relationship between the emission lenses array 530 and the optical emission chip array 700 all into consideration, reasonable $S_0$ and $f_{TX}$ are designed and are re-substituted in the following relational expression:

$$\frac{S_0}{S_1} = \frac{f_{fiber}}{f_{TX}}$$

In actual manufacturing process, a light emission size $S_1$ of the optical emission chip array 700 is a fixed value, and the focal length $f_{TX}$ of the emission lenses array 530 may be selected according to the value of the diameter $S_0$ of the first light spot required by the optical module. In view of the above, in the foregoing formula, the focal length $f_{fiber}$ of the optical fiber lenses array 550 may be calculated by selecting proper $S_0$ and $f_{TX}$, but it needs to be ensured that value ranges of $f_{TX}$ and $f_{fiber}$ are within the range of the foregoing formula.

Subsequently, the value of the diameter $S_2$ of the second light spot required by the optical module and the focal length $f_{fiber}$ of the optical fiber lenses array 550 that is obtained in the foregoing step are substituted in the following formula:

$$\frac{D}{S_2} = \frac{f_{fiber}}{f_{RX}}$$

In the receiving optical path, an optical fiber that is coupled outside of the optical module is full of light. Therefore, a diameter of a light spot at the position of the optical fiber is approximately equal to a diameter D of the optical fiber, which is about 50 um. The diameter $S_2$ of the second light spot is a known value, and $f_{fiber}$ has been obtained in the foregoing step. In this case, a value of the focal length $f_{TX}$ of the receiving lenses array 540 may be obtained according to the foregoing formula.

It should be noted that in the actual manufacturing process, the optical receiver chip array 800 also needs to be connected to a pad via bonding wires, where an arc height of the bonding wire is 0.12 mm. Therefore, it needs to be further ensured that $f_{RX} \geq 0.12$ mm, so as to prevent optical performance from being adversely affected due to gold wires being in contacting with a surface of the receiving lenses array 540.

If it is assumed that a vertical distance between the emission lenses array 530 and the optical receiver chip array 800 is H, the height of the step may be represented by the following formula:

$$\Delta h = H - f_{RX}$$

When the heights of the optical emission chip array 700 and the optical receiver chip array 800 of the optical module are approximately equal, the value of H is a difference between the distance from the emission lenses array 530 to the circuit board 300 and the distance from the optical receiver chip array 800 to the circuit board 300, where the difference may be measured by using a measuring tool.

In some embodiments, when the heights of the optical emission chip array 700 and the optical receiver chip array 800 of the optical module are not the same, but the specifications of the emission lenses array 530 and the receiving lenses array 540 are the same, the height of the step may also be obtained according to the foregoing calculation method.

According to the embodiments of the present disclosure, by provision of the first reflective surface and the second reflective surface, bidirectional multiplexing transmission of the optical fiber lenses array is achieved, and a quantity of optical fiber lenses is reduced, so that a quantity of optical fibers may be reduced. Further, by provision of the step, the difference in the focal lengths of the emission lenses array and the receiving lenses array and a difference in heights of the emitting laser chip and the receiving detector chip may be compensated, so that the focal points of the emission lenses array and the receiving lenses array can respectively fall on the optical emission chip array and the optical receiver chip array. In this case, the optical coupling efficiency may be improved, the mutual constrains between the diameters of the first light spot and the second light spot may be resolved to a certain extent, and a diameter value that meets parameter specifications may be achieved at the same time.

Finally, it should be noted that the foregoing embodiments are merely intended to describe the technical solutions of the present disclosure, and shall not be construed as limitation. Although the present disclosure is described in detail with reference to the foregoing embodiments, one of ordinary skills in the art may understand that modifications still may be made to the technical solutions disclosed in the foregoing embodiments, or equivalent replacements may be made to some of the technical features. However, these modifications or equivalent replacements do not deviate the nature of corresponding technique solutions from the spirit and scope of the technique solutions of the embodiments of the present disclosure.

What is claimed is:

1. An optical module, comprising:
 a circuit board, comprising a signal circuit and configured to transmit an optical signal;
 an optical emission chip array, attached on a surface of the circuit board and configured to emit an optical signal;
 an optical receiver chip array, attached on the surface of the circuit board and configured to receive converged light;
 an optical fiber array; and
 a lens assembly, disposed on the surface of the circuit board and configured to establish an optical coupling with the optical fiber array;
 wherein the lens assembly comprises:
  a body, wherein a step is provided at a bottom portion of the body;
  an emission lenses array, converting light emitted by the optical emission chip array into a collimated beam to be incident to a first reflective surface;
  an optical fiber lenses array, disposed on a side wall of the body, and configured to establish an optical coupling with the optical fiber array; and
  a receiving lenses array, enabling a collimated beam from the optical fiber lenses array to be converged onto the optical receiver chip array,
  wherein the step comprises two step surfaces with different heights at the bottom portion of the body, wherein one of the step surfaces is configured to arrange the emission lenses array, and the other step surface is configured to arrange the receiving lenses array, wherein a height difference between the two step surfaces is configured to compensate for a difference between focal lengths of the emission lenses array and the receiving lenses array, such that a focal point of the emission lenses array falls on an emission surface of the optical emission chip array, and a focal point of the receiving lenses array falls on a light sensitive surface of the optical receiver chip array; and
  a first groove and a second groove are provided at a top portion of the body, wherein a first reflective surface is formed at a bottom portion of the first groove, the second groove is configured to arrange a light filter, wherein the first reflective surface reflects light from the emission lenses array to the light filter, and the light filter refracts light from the first reflective surface towards the optical fiber lenses array, or reflects light from the optical fiber lenses array to the receiving lenses array, wherein a surface of the light filter that faces towards the optical fiber lenses array forms a second reflective surface to reflect light from the optical fiber lenses array to the receiving lenses array, wherein an intersection point of an axis of the receiving lenses array and the second reflective surface coincides with an intersection point of an axis of the optical fiber lenses array and the second reflective surface, and an intersection point of an axis of the emission lenses array and the first reflective surface does not coincide with an intersection point of the axis of the optical fiber lenses array and the first reflective surface.

2. The optical module according to claim 1, wherein the first reflective surface and the light filter are arranged on the lens assembly in a front-rear way.

3. The optical module according to claim 1, wherein a cavity is formed between the lens assembly and the circuit board to seal the optical emission chip array and the optical receiver chip array.

4. The optical module according to claim 1, wherein the optical receiver chip array and the optical emission chip array have a same height.

5. The optical module according to claim 4, wherein a specification of the receiving lens is different from that of the emission lens.

6. The optical module according to claim 5, wherein openings and grooves are formed in the body, for correspondingly arranging the emission lenses array, the receiving lenses array, the optical fiber lenses array, the first reflective surface, and a second reflective surface.

7. The optical module according to claim 1, wherein the optical receiver chip array and the optical emission chip array have different heights.

8. The optical module according to claim 7, wherein a specification of the receiving lens is the same as or different from that of the emission lens.

9. An optical module, comprising:
a circuit board, comprising a signal circuit and configured to transmit an optical signal;
an optical emission chip array, attached on a surface of the circuit board and configured to emit an optical signal;
an optical receiver chip array, attached on the surface of the circuit board and configured to receive converged light, wherein the optical receiver chip array and the optical emission chip array have different heights;
an optical fiber array; and
a lens assembly, disposed on the surface of the circuit board and configured to establish an optical coupling with the optical fiber array, the lens assembly comprising:
a body;
an emission lenses array, converting light emitted by the optical emission chip array into a collimated beam to be incident to a first reflective surface;
an optical fiber lenses array, disposed on a side wall of the body, and configured to establish an optical coupling with the optical fiber array; and
a receiving lenses array, enabling a collimated beam from the optical fiber lenses array to be converged onto the optical receiver chip array, wherein a specification of the receiving lens is different from that of the emission lens;

wherein the emission lenses array and the receiving lenses array are disposed at a bottom portion of the body, such that a focal point of the emission lenses array falls on an emission surface of the optical emission chip array, and a focal point of the receiving lenses array falls on a light sensitive surface of the optical receiver chip array;

a first groove and a second groove are provided at a top portion of the body, wherein a first reflective surface is formed at a bottom portion of the first groove, the second groove is configured to arrange a light filter, wherein the first reflective surface reflects light from the emission lenses array to the light filter, and the light filter refracts light from the first reflective surface towards the optical fiber lenses array, or reflects light from the optical fiber lenses array to the receiving lenses array, wherein a surface of the light filter that faces towards the optical fiber lenses array forms a second reflective surface to reflect light from the optical fiber lenses array to the receiving lenses array, wherein an intersection point of an axis of the receiving lenses array and the second reflective surface coincides with an intersection point of an axis of the optical fiber lenses array and the second reflective surface, and an intersection point of an axis of the emission lenses array and the first reflective surface does not coincide with an intersection point of the axis of the optical fiber lenses array and the first reflective surface.

10. The optical module according to claim 9, wherein the first reflective surface and the light filter are arranged on the lens assembly in a front-rear way.

11. The optical module according to claim 9, wherein when a height of the optical emission chip array is greater than that of the optical receiver chip array, a focal length of the emission lenses array will be smaller than that of the receiving lenses array.

12. The optical module according to claim 9, wherein when a height of the optical emission chip array is smaller than that of the optical receiver chip array, a focal length of the emission lenses array will be greater than that of the receiving lenses array.

13. The optical module according to claim 11, wherein a difference in the focal lengths of the emission lenses array and the receiving lenses array is equal to a difference in the heights of the optical emission chip array and the optical receiver chip array.

14. The optical module according to claim 12, wherein a difference in the focal lengths of the emission lenses array and the receiving lenses array is equal to a difference in the heights of the optical emission chip array and the optical receiver chip array.

15. The optical module according to claim 9, wherein optical fiber lenses in the optical fiber lenses array have a same specification such that the optical fiber lenses have a same attachment-surface level and a same focal length, and all focal points thereof fall in a same vertical plane.

16. The optical module according to claim 9, wherein the emission lenses array and the receiving lenses array are located in a same plane.

17. The optical module according to claim 9, wherein a limiting notch is provided at a bottom portion of the groove, with the light filter abutting against and being fixed at the limiting notch.

* * * * *